Dec. 1, 1959  C. W. HARRISON  2,915,693
REGULATED VOLTAGE SUPPLY
Filed April 1, 1958
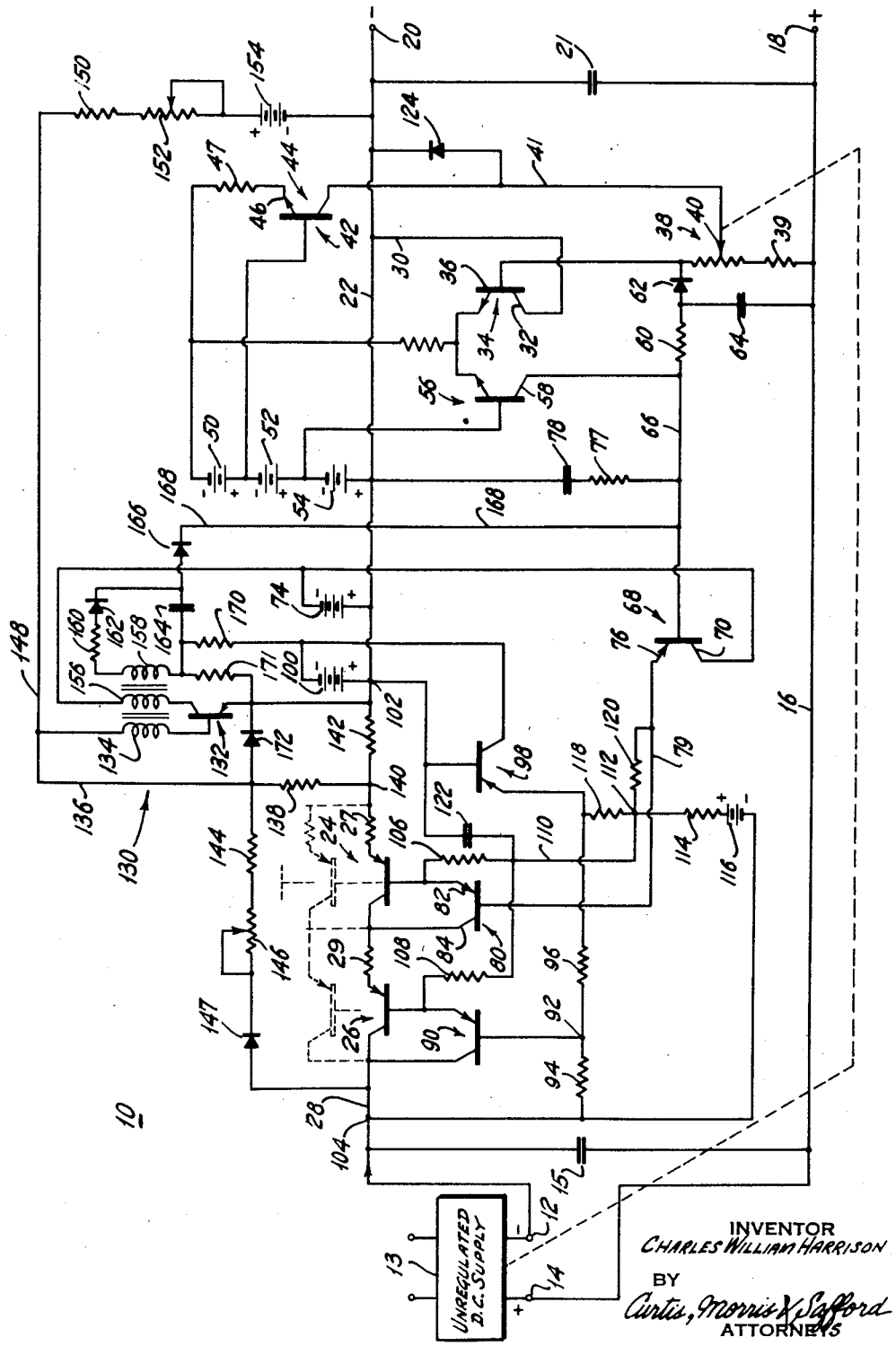
INVENTOR
CHARLES WILLIAM HARRISON
BY
Curtis, Morris & Safford
ATTORNEYS

United States Patent Office 2,915,693
Patented Dec. 1, 1959

2,915,693

REGULATED VOLTAGE SUPPLY

Charles William Harrison, Millington, N.J.

Application April 1, 1958, Serial No. 725,556

9 Claims. (Cl. 323—9)

This invention relates to a highly regulated direct-voltage power supply.

An object of this invention is to provide an improved all-transistor circuit for adjustably regulating an output voltage.

Another object is to provide such apparatus which is very stable in operation and relatively simple in construction but yet which is able to regulate an output voltage anywhere from zero to a relatively high maximum value and to hold the output voltage constant at a desired setting with from zero to large load currents.

Another object is to provide a circuit of this kind which is self-protecting so that upon overload or short circuit the easily damaged transistors will not be harmed.

A more specific object is to provide an all-transistor regulating circuit which can regulate an output voltage having a maximum value several times that of the maximum operating voltages for the individual transistors in the circuit.

These and other objects will in part be understood from and in part pointed out in the description given hereinafter.

In regulating a direct output voltage from a source it is customary to amplify variations in the output voltage and then apply these amplified variations in proper phase to a control element which corrects the output voltage and keeps it within close limits of a set value. One common kind of control element is a vacuum tube or tubes connected as a resistance in series with the source and the output voltage terminals, the grid or control electrode of the tube being changed in potential as required to keep the output voltage substantially constant.

A circuit using vacuum tubes in this way to regulate a voltage is well suited to applications requiring relatively very fast and exact regulating action. However, because vacuum tubes require sizeable voltages for proper operation, they are not well suited to regulators intended for very low voltages. Moreover, because vacuum tubes operate with heated filaments, they must be replaced from time-to-time when they burn out and they require appreciable stand-by power even at no load thus lessening the power efficiency of the overall regulating circuit in which they are used. For these reasons, therefore, it is desirable to use transistors in regulators intended for many applications.

Among the limitations of transistors is their susceptibility to damage or destruction by excessive voltage or current or by excessive internal power dissipation. Moreover, under widely varying loads the internal heating of a transistor will change and this causes a consequent drift in its amplification characteristics. In spite of these drawbacks, because of their compactness and long life, the possibility of operation without a heated cathode, and of operating efficiently with very low voltages, the use of transistors in voltage regulators for many applications appears highly desirable.

Several difficulties however are encountered in all-transistor circuits when one tries to regulate an output voltage all the way down to zero and, conversely, when one tries to regulate relatively high output voltages, for example, a hundred volts or more. Present day transistors are very sensitive to over-voltage and are quickly destroyed if the voltage across them exceeds their rated value. This value is typically under 50 volts maximum. Consequently, in regulating output voltages of zero to a hundred volts or more, it is necessary to employ as the series regulating element two or more transistors connected in series so that the voltage drop across each is approximately equal. However, this series operation of transistors requires a certain minimum bias current and in circuits previously developed this current made it difficult, if not impossible to regulate all the way down to zero output voltage at no load.

A second factor involved in regulating high output voltages with transistors is that the transistors in the feedback loops of circuits previously developed are subjected to the full output voltage. Consequently, the feedback transistors had to be connected in a resistance or other kind of voltage-dividing circuit to protect them when the output voltage was set at its maximum value. This in turn lowered the amplifying efficiency of these transistors. The present invention provides a circuit arrangement wherein the operating voltage applied to the feedback and or amplifying transistors is effectively independent of the regulated output voltage. They thus can operate at full efficiency regardless of whether the output voltage is set at its maximum or minimum value. The circuit is arranged so that when the output voltage is set at zero, it will remain at zero even though no current is being drawn by a load. No bleed resistance across the output terminals is required. In spite of possessing these desirable characteristics the circuit provided according to this invention is very stable in operation and it can handle up to several amperes output current at over a hundred volts and yet give considerably better than .1% regulation of voltage and ripple.

In accordance with the present invention, in one specific embodiment thereof, an output voltage is regulated by means of a series regulating element comprising two or more transistors connected in series in a voltage dividing network and adapted to be controlled through a base current applied to one of them to maintain the output voltage at a preselected value. The voltage dividing network interconnecting these series regulating transistors makes provision for a bias current to be applied to them. Thus when the output voltage is set at zero with no load current there is no tendency for the output voltage to rise above zero. The feedback transistors which control the bias current applied to the series regulating transistors are connected only to one lead of the output voltage terminals, rather than across both leads, and accordingly the operating voltage, as distinguished from the feedback or control voltage, applied to the feedback transistors remains substantially independent of the magnitude of the regulated output voltage. This means that transistors having a maximum breakdown voltage far less than the maximum output voltage being regulated can safely be employed in this circuit.

A variable bias adjustment for the feedback transistors in this circuit and an amplification or gain magnifying arrangement, such as are disclosed in the inventor's co-pending application, Serial No. 646,764, are employed so that great overall stability and efficiency in operation are achieved.

This all-transistor voltage-regulating circuit further incorporates in accordance with the invention a number of safeguards which prevent damage or burn out of the transistors. To keep the power dissipated in the main regulating transistors within permissible maximum limits there is provided a fully automatic arrangement which monitors both the current through the transistors and the voltage drop across them. If either of these quantities, alone or together, exceeds the permitted value the regulating transistors are immediately turned off and left off for a short interval to permit the clearing of the difficulty, such as a temporary short circuit or an overload. At the end of this interval, the regulating transistors are again turned on, the voltage drop across them and the current through them being measured, and if either or both quantities again exceed safe values for the particular regulating transistors used, the transistors are immediately turned off and left off for another short interval of time. These cycles of turning on and off are automatically repeated, but the turn-off action of this safety arrangement is so fast and so reliable that even though the output voltage terminals of the regulator remain short circuited, the regulating transistors though repeatedly being turned on and off will not be damaged.

A better understanding of the invention together with a fuller appreciation of its many advantages will best be gained from the following detailed description given in connection with the single figure of the accompanying drawing which shows a regulating circuit employing features of the invention.

The voltage regulating circuit 10 shown in the drawing is supplied at the left through the terminals 12 and 14 with an unregulated direct voltage from a supply 13, terminal 12 being negative and being bypassed to the positive one by a large capacitor 15. Terminal 14 constitutes one end of a ground bus 16 for the circuit. The right end of this bus is the positive output terminal 18. The corresponding negative output terminal 20 is bypassed to terminal 18 by a large filter capacitor 21. The voltage on this negative terminal is obtained through an output lead 22 and the series regulating transistors 24 and 26 from negative input terminal 12 via a short input lead 28. By controlling the series resistance of the regulating transistors, through the action of elements to be described shortly, the voltage on ouput terminals 18 and 20 is regulated at any pre-set voltage for any load current within the ratings of the circuit. To accommodate a maximum output voltage in excess of that which can safely be handled by a single regulating transistor 24, it is connected in series with the second transistor 26. For even higher output voltages, additional regulating transistors can be connected in series in the general way shown. To handle heavy output currents, regulating transistors 24 and 26 can be paralleled by one or more branches of series connected regulating transistors as indicated by the dotted lines. The number of these branches of course depends upon the maximum current rating of the regulating transistors in each branch. To equalize the resistance of each branch, a small resistor, such as resistors 27 and 29, can be placed in series with each regulating transistor.

To maintain the negative voltage on output terminal 20 constant at any given value relative to the voltage at terminal 18, variations of this voltage from the desired value are amplified and applied in proper phase to regulating transistors 24 and 26 to control the voltage drop across them. To this end output lead 22 is connected through a conductor 30 to the collector electrode 32 of an input amplifying transistor 34. The base of this transistor is biased from a voltage developed across a potentiometer 38 and the small resistor 39 connected in series to positive bus 16. The movable slider 40 of this potentiometer is connected via lead 41 to a high impedance current source, generally indicated at 42. Accordingly, when slider 40 is set in its uppermost position along potentiometer 38, the current flowing from the slider up through the potentiometer from bus 16 will produce a maximum voltage drop across the potentiometer and thus set the regulated output voltage on terminals 18 and 20 at its maximum value. Conversely, when slider 40 is in its lowest position on potentiometer 38 the output voltage at terminals 18 and 20 will be zero. The slider is ganged with input supply 13 so that the input voltage will be increased or decreased in accordance with the setting of the output voltage. In this way the voltage drop across the regulating transistors is kept near a normal working value of, for example, 15 volts. Regardless of the setting of slider 40 along potentiometer 38 the impedance seen by base 36 of input transistor 34 remains substantially constant. The advantages of this constant impedance bias arrangement are set forth in detail in the inventor's co-pending application, Serial No. 646,764, filed March 18, 1957.

Constant current source 42 includes a transistor 44 connected as an emitter follower whose emitter 46 has in series with it a resistor 47. A constant current is drawn from the emitter through this resistor and the batteries 50, 52 and 54 connected in series to lead 22. The base of this transistor is biased relative to the emitter by battery 50 and the voltage across resistor 47. Since these voltages are constant, transistor 44 draws a constant current from potentiometer 38 and shows effectively a high impedance. The voltage of battery 54 is made approximately equal and opposite the voltage drop across resistor 39.

Input transistor 34 comprises one side of a differential amplifier, the other side being a similar transistor 56 whose emitter is connected along with the emitter of transistor 34 through a current limiting resistor to the negative side of battery 50. The base of transistor 56 is connected to the junction of battery 54 and battery 52. Part of the output current from the collector 58 of transistor 56 is returned through a positive feedback resistor 60 and a diode 62 to base 36 of transistor 34 thereby to greatly enhance the amplification of the differential amplifier. Since the impedance seen by base 36 of transistor 34 is substantially constant for any setting of potentiometer 38, the amount of positive feedback present for any setting of slider 40 will be substantially constant. This means that the circuit will operate at maximum regulating efficiency regardless of whether the output voltage between terminals 18 and 20 is set at its minimum, at its maximum, or at any value in between. To prevent instability at higher frequencies and to minimize hum pickup at output terminals 18 and 20, the right end of positive feedback resistor 60 is bypassed through the capacitor 64 to the positive bus 16.

An amplified signal corresponding to any variation in the voltage on lead 22 is obtained from the collector 58 of transistor 56 and is applied through a lead 66 to the base of an intermediate amplifying transistor 68. The collector 70 of transistor 68 is biased through a battery 74 whose positive terminal is connected to output lead 22. Any variation in the current drawn through lead 66 from the base of transistor 68 causes an increase or decrease in the current flowing into its emitter 76. To further prevent instability at higher frequencies lead 66 is bypassed to lead 22 through a resistor 77 and a capacitor 78 in series.

The current supplied to emitter 76 of transistor 68 is drawn partly through a lead 79 from the base of a driving transistor 80. The emitter 82 of the latter is connected to the base of regulating transistor 24 so that variations in the current drawn from the base of transistor 80 in turn will control the series resistance of transistor 24 and hence the voltage drop between its emitter and collector electrodes. The collector 84 of transistor 80 is connected to the same potential as the collector of transistor 24.

To insure that the voltage drop across the second regulating transistor 26 is equal to that across transistor 24 and that these voltages change in unison, current is drawn from the base of transistor 26 through a driver transistor 90 whose base in turn is connected at 92 to a voltage dividing network. This network comprises the series resistors 94 and 96 and a transistor 98 connected as an emitter-follower, the potential of the emitter being effectively the same as that of the base. The base of the latter is connected directly to output lead 22 and its collector electrode is biased through a battery 100 whose positive terminal is connected to lead 22 at 102. The left end of resistor 94 is connected to input lead 28 at 104. Thus, the voltage drop between points 102 and 104, which represents effectively the total drop across regulating transistors 24 and 26, is divided across resistors 94 and 96 and the portion developed across resistor 94 is applied to transistor 90. This maintains the voltage drops across transistors 24 and 26 substantially equal to each other. Since current cannot flow from the base to the emitter of transistor 98, there is no leakage path through resistors 94 and 96 around regulating transistors 24 and 26.

To provide minimum operating currents for driver transistors 80 and 90, their emitters are supplied with currents through the respective resistors 106 and 108 which in turn are connected through the lead 110 to the junction 112. This last is supplied with current through a resistor 114 from the positive side of a battery 116 whose negative terminal is connected to lead 28 at 104. Similarly, current is supplied from junction 112 through a resistor 118 to the emitter of transistor 98, and through a resistor 120 to the emitter of transistor 68. To eliminate hum, the common point of resistors 106 and 108 is bypassed to output lead 22 by a capacitor 122. The advantage of the biasing arrangement just described and the use of transistor 98 is that the output voltage at terminals 18 and 20 can be regulated at any value all the way to zero even though there is no load current. Since input amplifying transistors 36 and 56 are of the NPN type, the collector of transistor 56 operates with current flowing directly from the base of intermediate amplifying transistor 68, which is PNP, and no other current need be drawn from lead 66. This permits maximum gain while making for a somewhat simpler arrangement than if these transistors were all of the same type.

Circuit 10 incorporates a number of safeguards against burnout. To prevent a sudden change in the setting of slider 40 of the output-voltage-setting potentiometer 38 from burning out transistors 36, 56 and transistor 42, lead 41 is bypassed to output lead 22 by a diode 124, and filter capacitor 64 is isolated from the potentiometer by diode 62. To prevent the regulating transistors 24 and 26 from being burned out by either excessive current through them or too great a voltage drop across them, they are protected by an automatic safety arrangement generally indicated at 130.

Safety circuit 130 includes a transistor 132 connected as a single-shot blocking oscillator which, each time the voltage and current ratings of the regulating transistors 24 and 26 are exceeded, disables intermediate transistor 68 and cuts off transistors 24 and 26. The length of time these transistors remain off, some several seconds, is determined by the discharge time constant of elements in circuit 130 shortly to be described. At the end of this time, transistors 24 and 26 are automatically turned on and, if the cause of the overload has been cleared, left on to operate normally. However, if there is still difficulty, they are once again turned off and the cycle repeated. Circuit 130 is responsive to both the voltage drop across as well as the current through these regulating transistors. Thus, when circuit 10 is first turned on at the beginning of a day, for example, and assuming there is no load, output filter capacitor 21 must be charged before the voltage on terminals 18 and 20 reaches the level controlled by potentiometer 38. If this level is near the maximum value of regulated output voltage, then when circuit 10 is first turned on, since the voltage across capacitor 21 cannot change from zero instantaneously, the voltage drop across the regulating transistors will be equal to the full input voltage on terminals 12 and 14. Also the current initially flowing into capacitor 21 through the regulating transistors will be large. The product of this initial voltage drop and current through transistors 24 and 26 can exceed their maximum power ratings. If so, safety circuit 130 will turn them on and then quickly off, repeatedly, at a fast enough turnoff rate and with sufficient delay between each turning on so that they will not be damaged in the process of bringing the initially uncharged capacitor 21 up to full charge. All this is accomplished automatically in such a reliable and fast-acting manner that it is virtually impossible to damage any element of circuit 10 under any conditions of overload or short-circuit.

The detailed operation of circuit 130 is as follows. Transistor 132 is normally biased to cutoff, its emitter being connected to output lead 22 adjacent junction 102 and its base being connected through a winding 134, a lead 136 and a dropping resistor 138, to a point 140 in the output current path of circuit 10. Point 140 is connected to point 102 by a low ohmage resistor 142 and the voltage drop across this resistor is a measure of the load current. In analogous manner, the voltage drop across resistor 138 is a measure of the total voltage drop across regulating transistors 24 and 26 in series, resistor 138 being the right end element in the series string including a resistor 144, a resistor 146 and a Zener diode 147 whose left end is connected at 104 to the input voltage lead 28. This diode has a back breakdown voltage slightly higher than the normal voltage drop across regulating transistors 24 and 26 so that there is no trickle of current bypassing these transistors. However, when the voltage drop becomes excessive, diode 147 breaks down and conducts.

The voltage between base and emitter of transistor 132, provided by resistors 138 and 142, is counteracted by the connection to the junction of lead 136 and winding 134 of a lead 148, a resistor 150, an adjustable resistor 152 and a battery 154, the negative side of the battery being connected to output lead 22.

The collector of transistor 132 is connected to a winding 156, which is magnetically coupled to winding 134, and which in turn in connected to battery 74. Normally, when the current through and the voltage across the regulating transistors are at safe levels, transistor 132 is turned off. However, when either or both quantities become excessive, transistor 132 suddenly begins to conduct. Then current in winding 156 induces a voltage in a third winding 158 which causes current to flow clockwise around the loop comprising winding 158, a resistor 160, a rectifier 162 and a large capacitor 164. This places a voltage on capacitor 164 which in turn is coupled through a diode 166 and a lead 168 to lead 66. The sudden application of voltage on lead 66 raises the potential of the base of intermediate transistor 68 and turns off the main regulating transistors 24 and 26. The length of time they remain turned off by the disabling voltage from capacitor 164 is thereafter determined by the back resistance of diode 162, which resistance is of the order of millions of ohms, the size of capacitor 164, and the amount of electric charge in it. This discharge time can easily be made several seconds or more. Diode 166 serves to isolate safety circuit 130 from lead 66 during ordinary operation of main circuit 10. To prevent forward conduction of diode 166 under ordinary circumstances a potential of several volts negative is applied to the lower end of winding 158 by the voltage dividing resistors 170 and 171 which are across battery 100.

The turn-on time of transistor 132 is very short, of the order of several tenths of a millisecond, and accordingly the action of safety circuit 130 in turning off transistors 24 and 26 is so fast that though the voltage across them or the current through them momentarily exceeds rated values, these transistors will be turned off before they are excessively heated or otherwise damaged.

When transistor 132 begins to conduct, the current in winding 156 induces a voltage in winding 134 which is coupled back from lead 136 to the emitter of the transistor through a diode 172, the voltage being of such phase as to momentarily increase current flow through the transistor. Diode 172 is advantageously a silicon crystal diode having a minimum forward conduction voltage of a half volt or so. This permits transistor 132 to generate a sizeable pulse into capacitor 164. When this happens, the main regulating transistors are turned off so there is no longer any substantial voltage drop across current measuring resistor 142, though of course there may be a drop across voltage measuring resistor 138. Now the latter is proportioned so that in the absence of a considerable load current through resistor 142, transistor 132 will turn off. This state then continues until capacitor 164 discharges sufficiently to allow circuit 10 to turn on, at which time transistor 132 may or may not turn on depending on the combined voltage drops across resistors 138 and 142, as explained previously.

It will now be appreciated that the improved voltage regulating circuit described operates in such fashion that the transistors employed are protected from burnout but yet they perform their functions with great efficiency. Transistors 34, 56 and 68 are energized through batteries connected to output lead 22, hence changes in the setting of the regulated output voltage across terminals 18 and 20 do not affect these transistors. In a circuit substantially identical to that described herein which has been built and successfully operated, the output voltage could be regulated at any value from zero to 120 volts maximum. Maximum load current at 120 volts was 3 amperes. The output voltage could be regulated to within 0.01 volt of its set value in going from zero to full load current.

The above description is intended in illustration and not in limitation of the invention. Various changes in the embodiment described may occur to those skilled in the art and these can be made without departing from the spirit or scope of the invention as set forth.

I claim:

1. An improved voltage regulating circuit comprising a pair of input terminals to be supplied with an unregulated voltage, a pair of output terminals, a conductive connection between one input terminal and an output terminal, a power regulating transistor connected between the other input and the other output terminal, a voltage feedback amplifier connected to said other output terminal to apply a control voltage to said regulating transistor in such phase as to keep the voltage on said output terminals substantially constant at a set value, current sensing means to measure the current through said regulating transistor, voltage sensing means for measuring the voltage drop across said transistor, and safety switch means controlled by said sensing means together to turn off said transistor on the occurrence of excessive voltage drop or current, said switch means having an internal time delay and automatically acting at the end of said delay to turn said transistor on, said switch means comprising a triggered pulse generator which applies a bias voltage pulse to said feedback amplifier to turn off said transistor, the duration of said pulse being of the order of a second, the initiation of said pulse being of the order of 100 microseconds.

2. The circuit as in claim 1 in further combination with a second regulating transistor in series with the first, driving means for controlling said regulating transistors in unison, said driving means including a voltage dividing network connected in parallel with said transistors, said network including in series at least two resistors and a transistor connected as an emitter follower, and battery means connected to said network to supply operating current whereby no current bypasses said regulating transistors to flow to said output terminals and the output voltage can be regulated to zero at no load.

3. An improved, all-transistor voltage regulating circuit comprising a first and a second input terminal, a first and a second output terminal, means to supply a direct voltage to said input terminals, a conductive connection between said second input and output terminals, an output lead connected to said first output terminal, a power regulating transistor having two output electrodes and a control electrode, low ohmic connections joining said output electrodes to said output lead and to said first input terminal, a driver transistor having an output connected to said control electrode and having an input, a transistor feedback amplifier whose input is connected to said output lead and whose output is connected to the input of said driver transistor, a source of constant current and a bias resistor connected across said output terminals, said bias resistor being connected to said amplifier to determine the voltage on said output terminals, and battery means connected to said output lead to energize said transistor feedback amplifier and said driver transistor independently of the voltage across said output terminals.

4. The circuit as in claim 3 wherein said amplifier includes a first and a second transistor each having two output electrodes and a control electrode, the control electrode of said first transistor being connected to said bias resistor, an output electrode thereof being connected to said output lead, the other output electrode being connected to the corresponding output electrode of said second transistor and being connected to said battery means, the other output electrode of said second transistor being connected to the control electrode of said third transistor, and being connected through a positive feedback resistor to the control electrode of said first transistor, one output of said third transistor being connected to said battery means, the other output electrode being connected to the input of said driver transistor, said first and second transistors being of the same type, said third transistor being of the opposite type.

5. The circuit as in claim 3 wherein one of said low ohmic connections in series with said regulating transistor is a current sensing resistor, and in further combination with voltage sensing means across said regulating transistor, and a cutoff voltage generator controlled by said current sensing resistor and said voltage sensing means, said generator suddenly applying a disabling signal to a control point in said circuit when the voltage drop across and the current through said regulating transistor exceed pre-determined values.

6. The circuit as in claim 5 wherein said generator is a transistor oscillator normally biased off, and includes a high back resistance rectifier and a large capacitor connected in a conductive loop and energized by said oscillator, said capacitor being connected to said control point to apply a long-time disabling pulse of voltage thereto.

7. The circuit as in claim 5 wherein said voltage sensing means includes a plurality of resistors connected in series as a voltage dividing network across said regulating transistor.

8. An improved, all-transistor voltage regulating circuit comprising a first and a second input terminal, a first and a second output terminal, means to supply a direct voltage to said input terminals, a conductive connection between said second input and output terminals, an output lead connected to said first output terminal, a power regulating transistor having two output electrodes and a control electrode, low ohmic connections joining said output electrodes to said output lead and to said first input terminal, a driver transistor having an output connected to said control electrode and having an input, a transistor feedback amplifier whose input is connected to said output lead and whose output is connected to the input of said driver transistor, a source of constant current and a variable bias resistor connected across said output terminals, said bias resistor being connected to said amplifier to determine the voltage on said output terminals, a large storage capacitor connected across said output terminals, and a diode connected from said current source to one end of said storage capacitor to prevent sudden changes in said bias resistor from applying an excessive voltage to said current source.

9. An improved transistor voltage regulating circuit comprising a first and a second input terminal, a first and a second output terminal, means to supply a direct voltage to said input terminals, a conductive connection between said second input and output terminals, an output lead connected to said first output terminal, a power regulating transistor having two output electrodes and a control electrode, low ohmic connections joining said output electrodes to said output lead and one of said connections being a current sensing element, a driving transistor having an output connected to said control electrode and having an input, a feedback amplifier whose input is connected to said output lead and whose output is connected to the input of said driver transistor, said amplifier having a control point to which the application of a disabling voltage turns off said regulating transistor, reference bias means connected to said amplifier to determine the voltage on said output terminals, voltage sensing means connected to measure the voltage drop across said regulating transistor, voltage generator means controlled by said current sensing element and voltage sensing means together, said generator being normally biased off but when the voltage drop across and the current through said regulating transistor exceed rated values, said generator being triggered on to apply a disabling voltage to said control point.

References Cited in the file of this patent

UNITED STATES PATENTS 2,832,900   Ford _____ Apr. 29, 1958